Oct. 22, 1935.  V. G. APPLE  2,018,480
MOLD FOR DYNAMO MACHINE ELEMENTS
Filed May 4, 1932  4 Sheets-Sheet 1
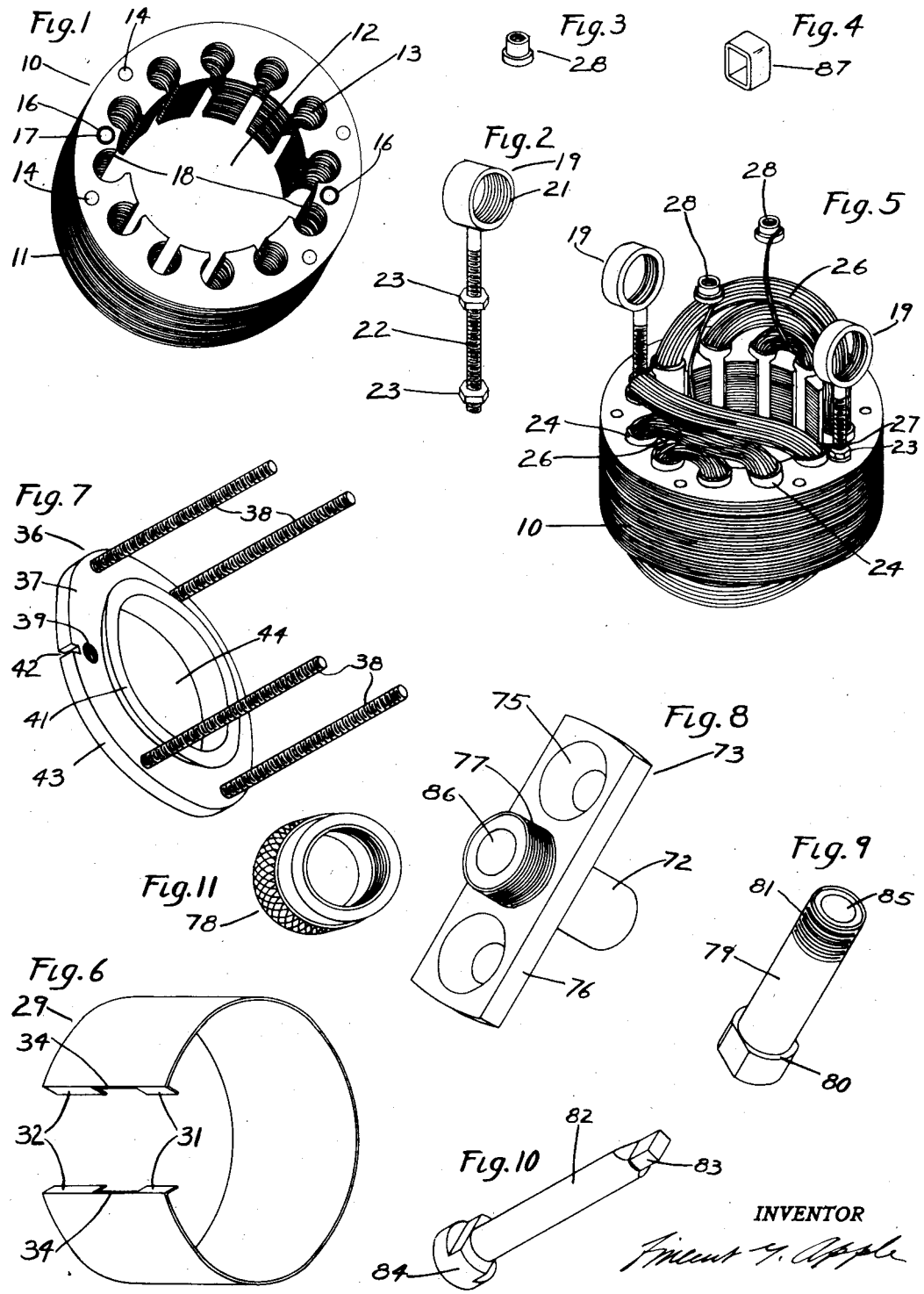

Oct. 22, 1935.  V. G. APPLE  2,018,480
MOLD FOR DYNAMO MACHINE ELEMENTS
Filed May 4, 1932  4 Sheets-Sheet 3

INVENTOR

Oct. 22, 1935.  V. G. APPLE  2,018,480

MOLD FOR DYNAMO MACHINE ELEMENTS

Filed May 4, 1932  4 Sheets-Sheet 4

INVENTOR
Vincent G. Apple

Patented Oct. 22, 1935

2,018,480

UNITED STATES PATENT OFFICE 2,018,480

MOLD FOR DYNAMO MACHINE ELEMENTS

Vincent G. Apple, Dayton, Ohio; Herbert F. Apple, Edward M. Apple, and Gourley Darroch executors of said Vincent G. Apple, deceased Application May 4, 1932, Serial No. 609,065

4 Claims. (Cl. 18—42)

This invention relates to dynamo electric machine elements and particularly dynamo electric machine elements comprising a magnetizable core, a winding, and a body of insulation molded to the core and around the coils to enclose them and form a housing for the machine.

An object of the invention is to provide a mold which is easily built and having wearable parts easily renewed, which is rapid in operation and not too costly.

Another object is to build the mold in sections in such a manner that different elements may be molded by changing one or another of the mold sections.

Another object is to so arrange the several parts and so operate the mold as to insure that a minimum number of failures will result in its operation.

That these and many other objects and meritorious features are attained in the apparatus and method hereinafter disclosed will be readily apparent by a consideration of the following description, reference being had to the accompanying drawings, wherein—

Fig. 1 is a perspective view of the magnetizable core of the field element which I have selected to illustrate an embodiment of my invention.

Fig. 2 is a perspective view of one of the metal brush terminals which are insulatedly supported on the core and which carry the electric current from the ends of the field coils to the brush pockets.

Fig. 3 is a perspective view of one of the metal line terminals which are attached to the other ends of the field coils to connect them to the source of current supply.

Fig. 4 is a perspective view of a short length of rectangular tubing, two such lengths being used as linings for the inner ends of the brush pockets, to provide permanent and accurate supports for the active end of the brushes.

Fig. 5 is a perspective view of the core shown in Fig. 1 with coils wound thereon and with the brush terminals insulatedly supported on the core, one end of each coil being connected to the brush terminals and the other ends of the coils connected to the line terminals.

Fig. 6 is a perspective view of the sheet metal protecting shell which surrounds the completed structure, protects the insulation mass and serves also as a name plate whereon directory and other informative matter may be etched or stamped.

Fig. 7 is a perspective view of the bearing plate with its threaded supporting studs assembled in it, the supporting studs being later passed through openings in the core and coils assembly Fig. 5 before the insulation body is molded about the structure.

Figs. 8, 9, 10 and 11 are perspective views of detail parts of the mold within which the insulation housing for the element is formed between and about the metal parts to join them together.

Similar numerals refer to similar parts throughout the several views.

Figure 12:
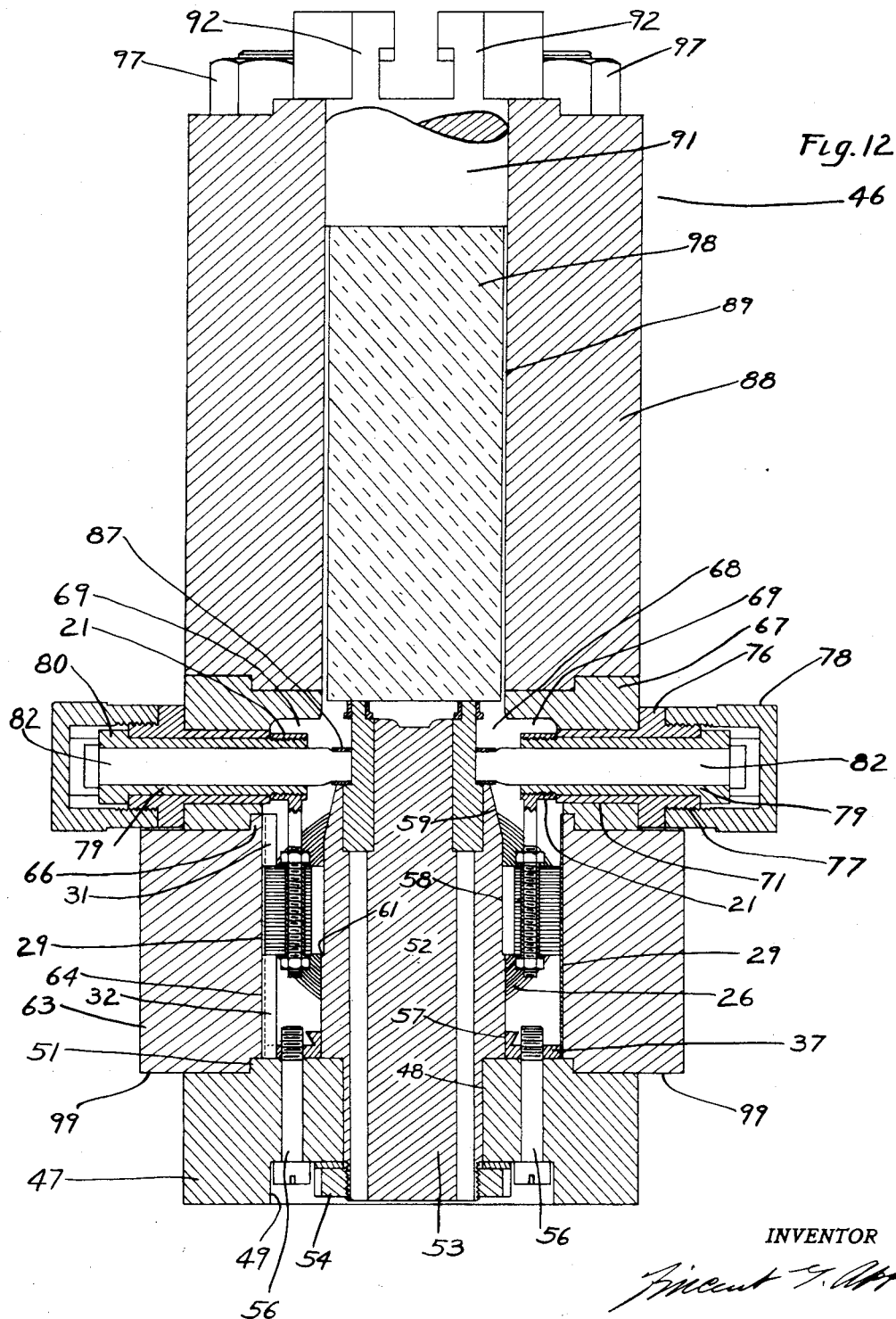
Fig. 12 is a vertical axial section through the mold with the several parts of the product which are shown in Figs. 1 to 7 held in their correct relative positions in the mold, the detail parts Figs. 8 to 11 functioning as holding means for some of the parts, and with a preformed slug of unmolded insulation in the mold ready to be fluxed and forced into the mold cavity to form the housing.
Figure 13:
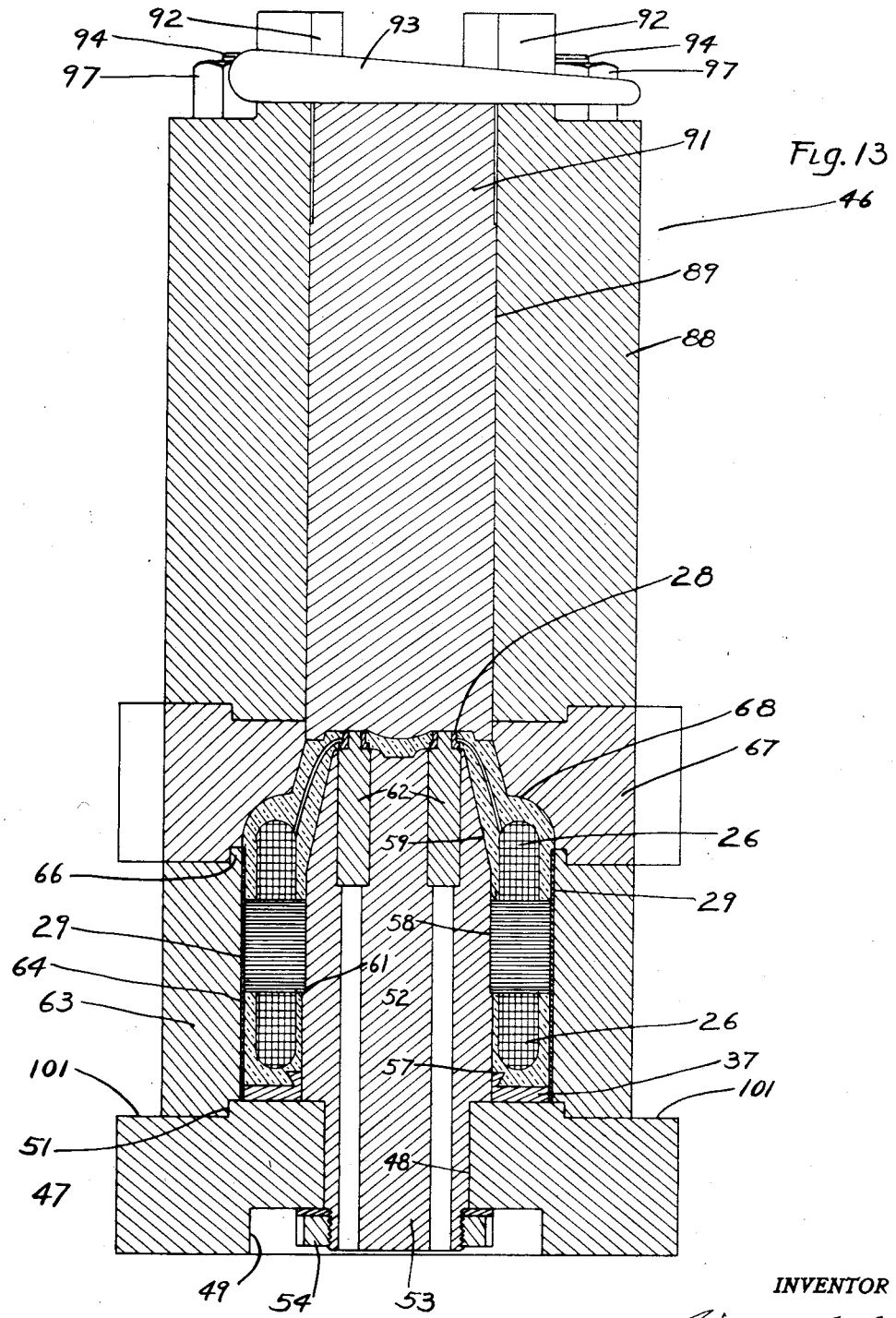
Fig. 13 is a vertical axial section taken at right angles to the section Fig. 12 but showing the mold after a plunger has forced the insulation into place to form the housing.
Figure 14:
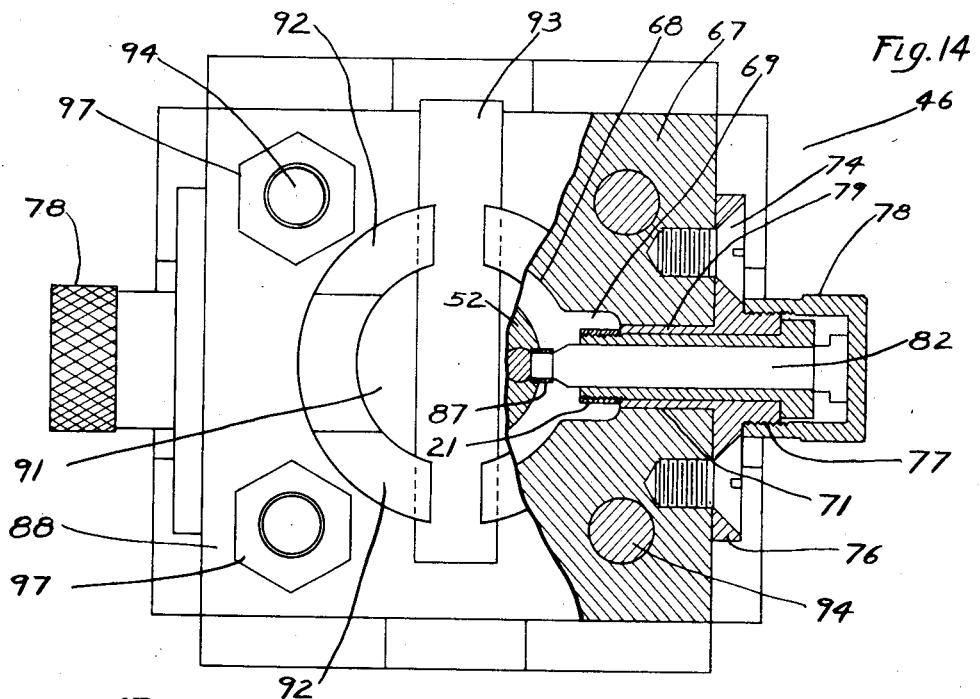
Fig. 14 is a top view of the mold with a portion broken away.
Figure 15:
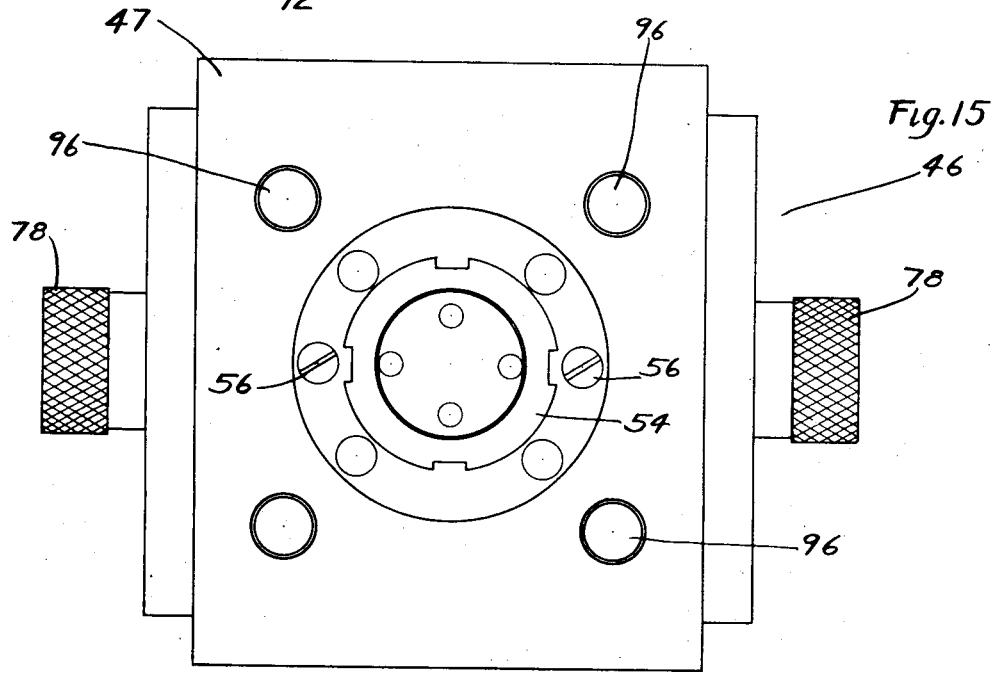
Fig. 15 is a bottom view of the mold.

The magnetizable core 10 comprises a plurality of laminæ 11 with a large central opening 12. Winding apertures 13 surrounding the opening 12, and smaller openings 14 and 16 pass through the laminæ near the outer periphery. The openings 16 are each lined with an insulation bushing 17. The laminæ are preferably held together with a suitable cement. To adapt the core to a bipolar field two teeth 18 are shortened as shown.

One of the two metal brush terminals 19 is shown in perspective in Fig. 2 and comprises an internally threaded ring 21 and an integral externally threaded stem 22, with two nuts 23 spaced apart on the stem a distance equal to the thickness of the core 10. After the winding apertures 13 of the core 10 are lined with some suitable sheet insulation as at 24, and coils 26 each in three interconnected parts have been laid in the slots, the two terminals are passed through the insulation bushings 17 and secured in place with the nuts 23. One end of each coil is then electrically connected to a brush terminal 19 as at 27 and the other end to a line terminal 28. Line terminal 28 is shown in detail in Fig. 3.

The shell 29, Fig. 6, is formed by bending a flat sheet of metal, preferably chromium stainless steel to cylindrical form and turning the ends to form the anchors 31 and 32. Spaces 33 are left between the anchors 31 equal in length to the axial length of the core 10. The anchors 31 and 32 and the edges 34 just touch when the shell is drawn tightly around the core 10. The shell then extends axially beyond the ends of the core at the one end an amount equal to the length of the anchors 31 and at the other end an amount equal to the length of the anchors 32.

The bearing plate and supporting stud assembly 36 shown in Fig. 7 comprises a metal end plate 37 having four small tapped holes into which the ends of the long studs 38 are screwed, and two larger tapped holes 39 for bearing head supporting screws. A short outwardly tapering hub 41 extends coaxially from the side of the plate. A radial slot 42 is wide and deep enough to clear the anchors 32 when they are brought tightly together. The outer diameter 43 of the plate is the same diameter as the outer diameter of the core 10 while the central opening 44 is slightly larger than the central opening 12 of the core.

The parts shown in Figs. 1 to 7 inclusive are parts of the product which are to be held in certain definite relative positions, and, while held in such relation to each other, imbedded in a body of plastic insulation which is then hardened. The mold 46 shown in Figs. 8 to 15 is adapted to hold the several parts of the product properly positioned, and at the same time provide means to press the plastic insulation into a compact mass of predetermined shape between and about the parts and hold it in that shape while it is being hardened.

Mold 46 comprises a base 47 of rectangular outer contour having a cylindrical central opening 48 counterbored from below as at 49 and having a short round hub 51 extending upwardly from its upper surface. The center plug 52 has a shank 53 at the lower end which fits into the central opening 48 of the base. A nut 54 holds the shank 53 drawn tightly into the opening 48. The center plug 52 is not removed from the base 47 in operating the mold. Screws 56 extend upwardly through and beyond the upper surface of the base for holding the end plate 37 positioned.

The body of the center plug 52 conforms to the inner contour of the completed product being somewhat larger in diameter at 57 than the central opening 12 of the core, slidably fitted to the central opening at 58, and somewhat tapered as at 59 at the upper end. The slight shoulder 61 is provided to support the core 10 against downward movement in the mold. Pins 62 are inserted in the top of plug 52 to hold line terminals 28 positioned while molding.

The second section 63 of the mold is of rectangular outer contour and has a round central opening 64 slidably fitted to the outside of the shell 29 when the edges 34 thereof are brought together. The lower end of the opening 64 is counterbored to fit snugly over the hub 51 of the base to hold the central openings of the two sections in axial alignment. The upper surface has the short hub 66 extending upwardly. The length of the central opening 64 is exactly the length of the shell 29.

The third section 67 of the mold is of rectangular outer contour with a round central opening 68 larger at the bottom end than at the top. The lower end of the opening 68 is counterbored to fit snugly over the hub 66 to hold the central openings in alignment. Pockets 69 extend radially from the central opening 68. These pockets are of such size as to leave space around the rings 21 of the brush terminals 19. Openings 71 extend radially from the pockets through the walls of the section.

The smooth hubs 72 of the members 73, Fig. 8, are fitted snugly to the openings 71, screws 74 extending through holes 75 in the flange 76 to hold the members 73 to the section 67. The threaded hubs 77 extend outwardly, and the internally threaded caps 78, Fig. 11, are screwed over them. The sole purpose of the members 73 is to provide the threaded hubs 77, and obviate the necessity of forming them integral with the section 67. The sleeves 79, Fig. 9, having heads 80 are slidably fitted to the openings 86 of the members 73, their inner threaded ends 81 screwing into the internally threaded rings 21 to hold the rings positioned. Round pull bars 82, Fig. 10, with inner ends cut rectangular as at 83 and heads 84 at their outer ends are slidably fitted to the openings 85 of the sleeves 79. The metal brush pocket linings 87, Fig. 4, fit snugly over the rectangular ends 82 and are thereby held positioned.

The upper section or stock ring 88 is of square outer contour with a round central opening 89 to which is slidably fitted the plunger 91. Hooks 92 are integral parts of the stock ring 88 and provide shoulders under which the wedge 93 may be driven to hold the plunger 91 in place once it is pressed to its final position in which its lower end is as far from the top of the center plug 53 as the thickness of the closed end of the cup shaped field element. (See Fig. 13). Long studs 94 are threaded in the base section as at 96, Fig. 15, and extend upwardly through all of the sections, the nuts 97, threaded on the upper ends of the studs holding all of the sections tightly together when assembled as shown. In disassembling the mold the nuts 97 are removed and the several sections lifted off, but except in making repairs to the mold the members 73 are not removed from the section 67, neither are the long studs 94 nor the center plug 52 removed from the base 47.

In operation the mold is disassembled and the bearing plate assembly 36, Fig. 7, is slipped over the center stud 52, with the small threaded studs 38 upward and fastened to the base with the screws 56. The core and coils assembly 19, Fig. 5, with the shell 29, Fig. 6, drawn tightly around it is next slipped over the center plug until the bore of the core rests on the shoulder 61 of the plug, and the anchors 32 of the shell enter the notch 42 of the bearing plate 37 whereupon the second sections 63 of the mold is slipped into place over the long studs 94.

The section 67 is next slipped in place over the long studs 94 and the threaded ends 81 of the sleeves 79 are screwed into the rings 21. The pull bars 82 are then inserted into the opening 86 of the member 73 and a brush pocket lining 87 placed over the inner rectangular end 83 of each bar. The stock ring 88 is now put in place over the long studs 94 and the nuts 97 put on and tightened. The entire assembly is now heated.

After the mold with the several parts of the product, all assembled as described, are heated to the proper temperature, a preformed slug 98 of moldable insulating material is dropped into the opening 89, and the plunger 91 is inserted above it as in Fig. 12 and pressure is applied thereto. When the slug 98 absorbs sufficient heat from the mold to become plastic it yields to the applied pressure and the plunger is pressed home, after which the wedge 93 is inserted as in Fig. 13 and the insulation is hardened.

It will be seen that the structure, the manner of making it and the apparatus used have many advantages, as for instance the outer metal shell 29, Fig. 6, has several functions in the completed element. It hides the outer diameter of the core 10, which being composed of the edges of a plurality of stampings, presents an uneven and more less unattractive surface; it provides a protective cover for the insulating mass which comprises the body, adding to its resistance to physical injury at a place where it is most needed; and it provides a place where patent numbers, maker's name, voltage, amperage, horsepower, and similar matter may be etched or stamped.

Inasmuch as it is often desirable to change the capacity of a motor by merely using more laminæ to provide a longer core, the mold is so divided that the middle section 63, the shell 29 and the center plug 52 may readily be exchanged for longer parts whereupon a longer, but otherwise the same, field element may be produced.

Because of the variation in voltage employed in two field elements of the same size, it often happens that one may require brushes of several times the size of the other. With the mold divided as herein shown, the mold section 67 carrying the brush pocket forming means may readily be exchanged for one having larger or smaller brush pocket forming means, or, where an alternating current stator, which does not require brush pockets is to be made the brush pocket, forming means may be omitted altogether from the section 67 of the mold.

The mold is rapid in operation. In extracting the completed product from the mold the nuts 97 and the screws 56, Fig. 12, are first removed. The section 63 is then held under the projecting edges 99 while downward pressure is applied to the projecting edges 101, Fig. 13, of the base 47, thereby removing the base 47 and withdrawing the center plug 52 from the molded field element. The caps 78 are now removed, the pull bars 82 withdrawn, and the sleeves 79 unscrewed from the rings 21, and while the mold is still resting on the edges 99 of section 63 the plunger 91 is pressed downwardly through the stock ring 88 whereupon the completed element is discharged from the mold.

The proportion and arrangement of the parts of the mold herein disclosed adapt it particularly to molding a body of insulation around an electrically wound structure. A conventional mold, such as is commonly used when molding plastic insulation around metal inserts, would not answer the purpose, for in conventional molding practice it is the custom to make the horizontal section of a vertically movable mold plunger equal to the largest horizontal section through the cavity. In such a mold the preformed slug of insulation rests directly against the inserts and is pressed against them with great force before the slug is softened, while in the mold herein disclosed the plunger 91 is restricted in diameter to substantially the size of the center plug 52, and the winding surrounds the center plug, so that no amount of pressure applied to the slug 98 by the plunger 91 may force the slug against the winding 26, until after the slug softens and spreads laterally over the top of the center plug 52, after which the softened insulation may flow downwardly to and around the winding.

Having described an embodiment of my invention, I claim,

1. Apparatus for making a dynamo electric machine element, said element having a body of insulation in the form of an inverted cup with a magnetic core and winding imbedded in the sides of the cup intermediate the top and bottom with brush pockets extending through the sides of the cup near the bottom, and with line terminals imbedded in the bottom, said apparatus comprising, in combination, a base section having an upwardly extending center plug having an outer contour corresponding to the inside of the cup, spaced apart pins extending upwardly from the upper end of said center plug for supporting said line terminals, an intermediate section having inside contour corresponding to the outside of the cup concentrically supported on the upper side of the base section, a second intermediate section, concentrically supported on the upper side of the first intermediate section having inside contour corresponding to the outside contour of the cup near its bottom and having laterally withdrawable brush pocket forming means extending into the space between the center plug and said second section, a stock ring section concentrically supported on the upper surface of the second intermediate section having a central opening of uniform diameter throughout and substantially the diameter of the said center plug extending directly into the opening in said second intermediate section, means to hold the several sections together, a plunger slidably fitted to the said central opening of said stock ring, and means to stop said plunger in its downward movement when its lower end is as far from the top of the center plug as the thickness of the bottom of said cup.

2. A mold for making the dynamo electric machine element described in claim 1, said mold comprising a base section with an upwardly extending center plug having an outer contour corresponding to the inside of the cup, spaced apart pins extending upwardly from the upper end of said center plug for supporting said line terminals, a mold body concentrically supported on the upper side of the base section having a central opening corresponding at the lower end to the outside of the cup, the upper end of said opening being uniformly restricted to substantially the diameter of said center plug, a close fitting plunger movable downwardly in the said upper end of said opening to as near to the top of said center plug as the thickness of the bottom of said cup, and laterally withdrawable brush pocket forming means extending into the space between the said center plug and the said mold body for supporting brush terminals and brush pocket linings.

3. A mold for making a dynamo electric machine element, said element comprising a hollow body of insulation having brush pockets extending laterally through the sides of said hollow body, said pockets being lined at their outer ends with a round interiorly threaded metal brush terminal and at the inner end with a rectangular metal brush pocket lining, the mold comprising a body having a cavity corresponding to said hollow body of insulation, and brush pocket forming means extending through the side of said mold body into said cavity comprising a sleeve rotatable and axially slidable through a smooth opening in the side of said body and threaded at its inner end into said brush terminal, and a pull bar rotatable and axially slidable in said sleeve having a rectangular inner end extending into and supporting said brush pocket lining.

4. The structure defined in claim 3 having a threaded hub on the outside of the mold body surrounding the said sleeve, and a cap threaded over said hub holding the pull bar from being forced out of the said sleeve by pressure within the said cavity.

VINCENT G. APPLE.